United States Patent
Sacco et al.

(10) Patent No.: US 9,374,540 B1
(45) Date of Patent: Jun. 21, 2016

(54) MULTI-REGISTER BANK ENHANCED DIGITAL TIME DELAY INTEGRATION USING CMOS ROIC

(71) Applicant: EXELIS, INC., McLean, VA (US)

(72) Inventors: Andrew P. Sacco, Pittsford, NY (US); J. Daniel Newman, Pittsford, NY (US)

(73) Assignee: Exelis, Inc., Herndon, VA (US)

( * ) Notice: Subject to any disclaimer, the term of this patent is extended or adjusted under 35 U.S.C. 154(b) by 40 days.

(21) Appl. No.: 14/595,419

(22) Filed: Jan. 13, 2015

(51) Int. Cl.
*H04N 5/353* (2011.01)
*H04N 5/378* (2011.01)
*H04N 5/372* (2011.01)

(52) U.S. Cl.
CPC ............ *H04N 5/353* (2013.01); *H04N 5/372* (2013.01); *H04N 5/378* (2013.01); *H04N 5/37206* (2013.01)

(58) Field of Classification Search
None
See application file for complete search history.

(56) References Cited

U.S. PATENT DOCUMENTS

| | | | |
|---|---|---|---|
| 6,885,002 B1 | 4/2005 | Finch et al. | |
| 6,906,749 B1 | 6/2005 | Fox | |
| 7,274,454 B2 | 9/2007 | Kowarz et al. | |
| 7,289,209 B2 | 10/2007 | Kowarz et al. | |
| 7,551,059 B2 | 6/2009 | Farrier | |
| 8,179,296 B2 | 5/2012 | Kelly et al. | |
| 8,451,354 B2 | 5/2013 | Cazaux et al. | |
| 8,463,078 B2 | 6/2013 | Goodnough et al. | |
| 8,558,899 B2 | 10/2013 | Grycewicz | |
| 8,629,387 B2 | 1/2014 | Pflibsen et al. | |
| 8,692,176 B2 | 4/2014 | Kelly et al. | |
| 8,780,418 B1 | 7/2014 | Bluzer et al. | |
| 2011/0017915 A1* | 1/2011 | Curry | G01N 21/6458 250/362 |
| 2012/0127331 A1* | 5/2012 | Grycewicz | H04N 3/1593 348/222.1 |
| 2013/0334399 A1* | 12/2013 | Dupont | H01L 27/14641 250/208.1 |
| 2014/0061472 A1* | 3/2014 | Salvestrini | H04N 5/332 250/339.02 |
| 2014/0104468 A1* | 4/2014 | Parker | H04N 5/37213 348/295 |
| 2014/0368703 A1* | 12/2014 | Yao | H04N 5/378 348/295 |
| 2015/0116564 A1* | 4/2015 | Williams | H04N 5/37455 348/308 |
| 2015/0136955 A1* | 5/2015 | Wein | H04N 5/37206 250/208.1 |
| 2015/0215536 A1* | 7/2015 | Buell | H04N 5/23245 348/294 |
| 2015/0365619 A1* | 12/2015 | Mayer | H04N 5/37206 348/295 |

* cited by examiner

*Primary Examiner* — Shahbaz Nazrul
(74) *Attorney, Agent, or Firm* — RatnerPrestia

(57) ABSTRACT

An integrated circuit includes an array of pixels for capturing and processing successive image frames of a moving scene, the array including at least one row of pixels (inputs); and at least one current value register, in which the current value register is configured to store current pixel values captured from the array (inputs). Also included is at least one set of multiple accumulated value registers, in which each accumulated value register is configured to communicate with the current value register. Furthermore, there is included at least one readout register, in which the readout register is configured to communicate with the set of accumulated value registers. A controller is also included for shifting and summing the rows of pixels and outputting a summed column as a time delayed integrated (TDI) signal.

20 Claims, 8 Drawing Sheets

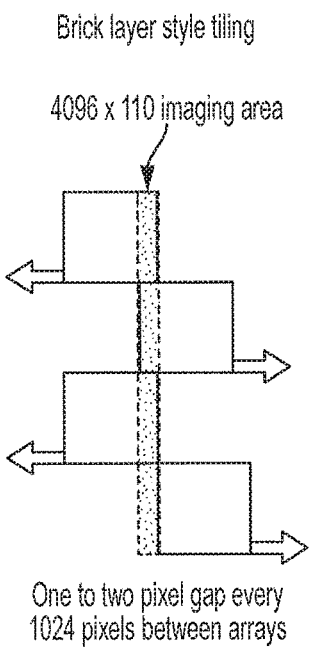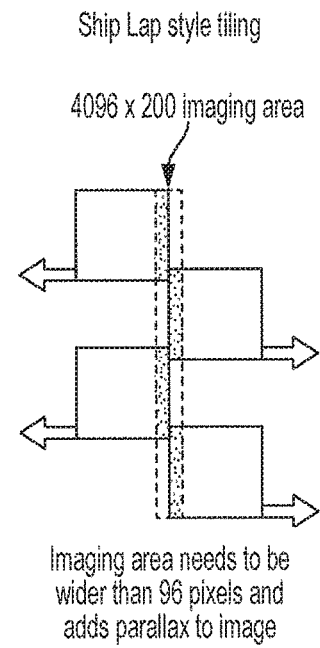
FIG. 6A
FIG. 6B

MULTI-REGISTER BANK ENHANCED DIGITAL TIME DELAY INTEGRATION USING CMOS ROIC

FIELD OF THE INVENTION

The present invention relates, in general, to digital time delay integration (TDI) scanning array devices using complimentary MOS (CMOS) technology. More specifically, the present invention relates to TDI functions built into an on-chip CMOS read-out integrated circuit (ROIC). The TDI functions use multiple accumulation registers for each row of pixels, thereby providing TDI accumulation for multiple spectral bands.

BACKGROUND OF THE INVENTION

Digital time delay integration (TDI) scanning array devices have been developed in recent years for applications in broad band (panchromatic) and multispectral imaging (MSI). These devices are typically constructed as 2-layer hybrid focal planes, comprised of a photo-detector layer and a Si-CMOS read-out integrated circuit (ROIC) that is bonded to the photo-detector layer. The ROIC performs a digital domain TDI function using high speed memory accumulators and shift registers that are configured to emulate an analog high speed CCD capacitor chain used in conventional analog TDI detectors. For conventional multispectral imaging applications, which support "m" spectral channels, the focal plane array is typically configured with "m" independent TDI arrays, each separated by a finite "in-track" spatial offset and with corresponding "m" optical band pass filters to selectively pass only the spectral band of interest.

An example of a conventional multispectral imager 10 with four spectral bands (m=4) is shown in FIG. 1. In this example, four independent TDI arrays are required 11, 12, 13 and 14 in order to image a scene with four different color bands. Each array is covered by a discrete color filter (not shown). Each array is also independently clocked and read out, as the image scene moves relative to each array at a constant velocity.

Conventional TDI scanning is used to provide long integration times on a moving platform without blurring the image. This is achieved by taking a series of "n" high speed snapshots (or frames), each of which instantaneously freezes the platform motion, and subsequently shifting and adding the signal for each successive pixel in a time sequence from frame n to frame n+1, in a manner that tracks the platform velocity. This technique allows for arbitrarily long integration times on a moving platform that is limited by the number of TDI channels in the array (typically between 24-128 channels).

The in-track spatial offset between arrays, as shown in FIG. 1, can produce significant parallax error in remote sensing systems after aligning the pixels from the four bands to compensate for the offsets in the final image. For large arrays the parallax error between the first and last filter band can make the imagery unusable. The off-chip digital readout circuitry must also be repeated for each band.

The temporal offset between the first and last band is as follows:

Offset=(array width+offset between arrays)*n arrays*$T_{clk}$ where n is the number of arrays, Tclk is the pixel clock for the TDI shift register, and
array width=max TDI*Pixel pitch Accordingly, the more numerous the number of arrays, the greater the temporal offset between the first and last band. The greater the offset, the larger is the parallax error.

FIG. 8 shows an alternate method for achieving multispectral images using a filter wheel with a single TDI detector. In this example, there are 6 color bands (m=6) that are acquired by sequentially integrating the TDI detector with each color in the color wheel then switching to the next color. This results in reduced parallax offset as the offset between arrays is now eliminated.

In conventional analog TDI scanning detectors (e.g. CCD's), the TDI integration is done by transferring and accumulating the charge along each cascade (for example, each row) in the array in-phase with the image motion to build up photo electrons. Once the image reaches the end of the cascade, photo electrons are dumped onto an output node and converted into digital values.

The digital TDI system accumulates signal electrons by frame stepping where each frame is completely readout to the accumulator and summed with the next frame in the sequence. In the digital TDI domain, the integration occurs in the accumulator, after the photo charge has been detected and converted to a digital value. An example of digital accumulation, and pixel-by-pixel summation (integration of photo electrons in the analog domain), which is in-phase with the image motion is shown in FIG. 2.

As shown in FIG. 2, the scan direction of the imager is from right to left in the x-direction, and time is sequenced in the y-direction. The image array includes one row of six detectors (A-F) oriented along the "in-track" or x-direction. Thus, a snap, or frame image consists of six pixels (a detector may be referred to herein as a pixel, once a digital value has been assigned to the analog voltage outputted by the detector). Each frame 21 in the example is shifted by one pixel, which is less than the array size of six detectors. The number of pixels shifted may be determined by a system controller (not shown), which may be external to the CMOS ROIC; the amount of shift may be based on the relative speed of the imager with respect to the scene under observation. The number of pixels shifted may be greater than one pixel, and may be dynamically controlled by the system controller.

Each frame 21 is completely read out to an accumulator and summed with the next frame 21 in an accumulation sequence, designated as 22. Thus, pixel B of frame 1 and pixel A of frame 2 are summed in the sequence. Next, pixel A of frame 3 is added to pixels C and B of respective frames 1 and 2. By the time the imager has moved to frame 6, the accumulation sequence includes the sum of pixels A-F from frames 1-6, respectively. Accordingly, the first column of full TDI accumulation occurs after frame 6 is snapped and summed by the imager.

The example of FIG. 2 depicts a digital TDI sequence showing accumulation for a single color band. A TDI walk-on for the single band is 5 frames and a full TDI occurs at 6 frames. A TDI walk-off, which is similar to the TDI walk-on, is also 5 frames, as shown. In general, however, if more than one band is desired, the number of columns required is as follows:

Columns=Bands×TDI

Accordingly, if the required TDI is 6 and the number of color bands required are 4 (as shown in the example of FIG. 1), the number of necessary columns become 24 (four accumulators needed). With four bands, a width of 24 columns is required. In the example of FIG. 1, the in-track spatial offset between arrays would produce significant parallax error in remote sensing systems, because the pixels in the final image require spatial alignment. For larger color arrays, the parallax error between the first and last color band can make the imagery unusable.

As will be explained, the present invention overcomes the aforementioned parallax error by providing multiple register banks which have the capability to accumulate multiple interlaced images, while only using a single accumulation ROIC per detector array.

SUMMARY OF THE INVENTION

To meet this and other needs, and in view of its purposes, the present invention provides an integrated circuit for generating data of an image including a focal plane array (FPA) of sensing elements for capturing an image of a scene in motion relative to the FPA, and a current value register for storing pixel values captured by the sensing elements. Also included are a plurality of accumulated value registers for selectively summing the pixel values from the current value register with pixel values previously stored in one of the accumulated value registers, and a readout register for selectively receiving a sub-set of the summed pixel values from the one accumulated value register. The sub-set of the summed pixel values corresponds to a time delayed integration (TDI) value of at least one column of multiple frames taken of the scene in motion.

The integrated circuit further includes an analog/digital (A/D) converter serially coupled to the FPA for digitizing the captured image and transferring the captured image to the current value register. The FPA includes at least one row and N columns of sensing elements, in which the value of N is an integer greater than 1. The current value register is configured to store N pixel values captured by the one row of sensing elements, in which the N pixel values are stored in N registers.

The accumulated value registers each includes N accumulated values, in which M accumulated value registers, are included N registers for receiving N pixel values stored in corresponding N registers of the current value register. The one accumulated value register is configured to shift the N pixel values by one register position. The readout register is configured to receive the sub-set of the summed pixel values, in which the sub-set is defined as a pixel value stored in an $N^{th}$ register of the one accumulated value register, and the $N^{th}$ register is a register positioned last in a shift sequence of N registers.

The integrated circuit further includes an accumulator in communication with the readout register for aggregating a sequence of the received sub-set of the summed pixel values. The sequence represents an integrated output of pixels in phase with the scene in motion.

The integrated circuit further includes a parallel data bus coupled between the current value register and each of the accumulated value registers, and a controller for selectively outputting a first set of pixel values from the current value register to one of the accumulated value registers, and next outputting a second set of pixel values from the current value register to another one of the accumulated value registers. The first set of pixel values read into the current value register during a first frame obtained by the sensing elements is subsequently stored in a first accumulation register, and the second set of pixel values read into the current value register during a second frame obtained by the sensing elements is subsequently stored in a second accumulation register.

The integrated circuit further accommodates multiple filter bands for filtering the first frame with a first color filter and the second frame with a second color filter. The first frame set of pixel values is collected and filtered by the first color. The second frame set of pixels is collected and filtered by a second color. One of the accumulated value registers is configured to receive a first color filtered set of pixel values, and the other one of the accumulated value registers is configured to receive a second color filtered set of pixel values. This sequence is repeated for multiple filter bands each band with independent accumulated value registers.

Another embodiment of the present invention provides an integrated circuit for generating data of an image including:

(a) a focal plane array (FPA) of M rows and N columns of pixels for capturing successive frames of an image of a moving scene, in which each frame includes a succession of sets of rows of pixels, in which each set includes at least one row of pixels, (b) multiple current value registers, in which each current value register is configured to store current pixel values captured from a respective row of pixels, (c) a plurality of sets of accumulated value registers, in which each set of accumulated value registers is configured to communicate with a respective current value register, (d) a plurality of readout registers, in which each readout register is configured to communicate with a respective set of accumulated value registers, and (e) a controller for providing, in succession, rows of pixel values into at least one set of accumulated value registers, shifting and summing the rows of pixels and outputting a summed column as a time delayed integrated (TDI) signal.

Execution by the controller includes the following steps:

(i) pixel values from a first row of pixels are propagated to a first accumulated value register in a first set of accumulated value registers;

(ii) the first row of pixels in the first accumulated value register is shifted by at least one column;

(iii) a second row of pixels are provided to the first accumulated value register and summed with the first shifted row of pixels; and (iv) a column of the summed first and second row of pixels stored in a first accumulation register is read out to a first readout register.

An analog/digital (A/D) converter is coupled between each row of pixels and each current value register, in which each A/D converter is configured to digitize pixel values of a respective row of pixels. Multiple filter bands are included for filtering at least a first row of pixels with a first color filter and a second row of pixels with a second color filter. Pixel values from the first and second color filters are propagated to first and second accumulated value registers, respectively, in the one set of accumulated value registers.

The controller is configured to provide, in succession, rows of pixel values into the sets of accumulated value registers, respectively, in which each set receives pixel values from the multiple filter bands for each row of pixels.

The multiple filter bands may be provided by a color wheel rotating in front of the FPA at a rate dependent on the motion of the FPA relative to the scene.

Yet another embodiment of the present invention is a method for reading out image data from a moving platform comprising the steps of:

(a) capturing successive image frames of a moving scene using a focal plane array (FPA) of N columns and at least one row of pixels;

(b) filtering the successive image frames using multiple color bands;

(c) storing, in succession, current first and second colored image frames from the at least one row of N pixels in a current value register;

(d) moving, in succession, the current first and second colored image frames into first and second accumulated value registers;

(e) shifting the first colored image frame in the first accumulated value register, and shifting the second colored image frame in the second accumulated value register;

(f) storing, in succession, another current first and second colored image frames into the current value register;

(g) summing, in succession, the first and second colored image frames in the first and second accumulated value registers, respectively, with the other current first and second colored image frames from the current value register; and (h) outputting from a readout register the first summed and second summed colored image frames as time delayed integrations (TDIs), respectively.

The steps of shifting and summing are provided by separate accumulated value registers, in which each accumulated value register is associated with a particular color band.

It is understood that the foregoing general description and the following detailed description are exemplary and not restrictive of the invention.

BRIEF DESCRIPTION OF THE FIGURES

The invention may be understood from the following detailed description when read in connection with the accompanying figures:

FIG. 6A is an example of tessellation to create long linear arrays by using a brick layer style tiling, in accordance with an embodiment of the present invention.

FIG. 6B is an example of tessellation to create long linear arrays by using a ship lap style tiling, in accordance with an embodiment of the present invention.

DETAILED DESCRIPTION OF THE INVENTION

Figure 3:
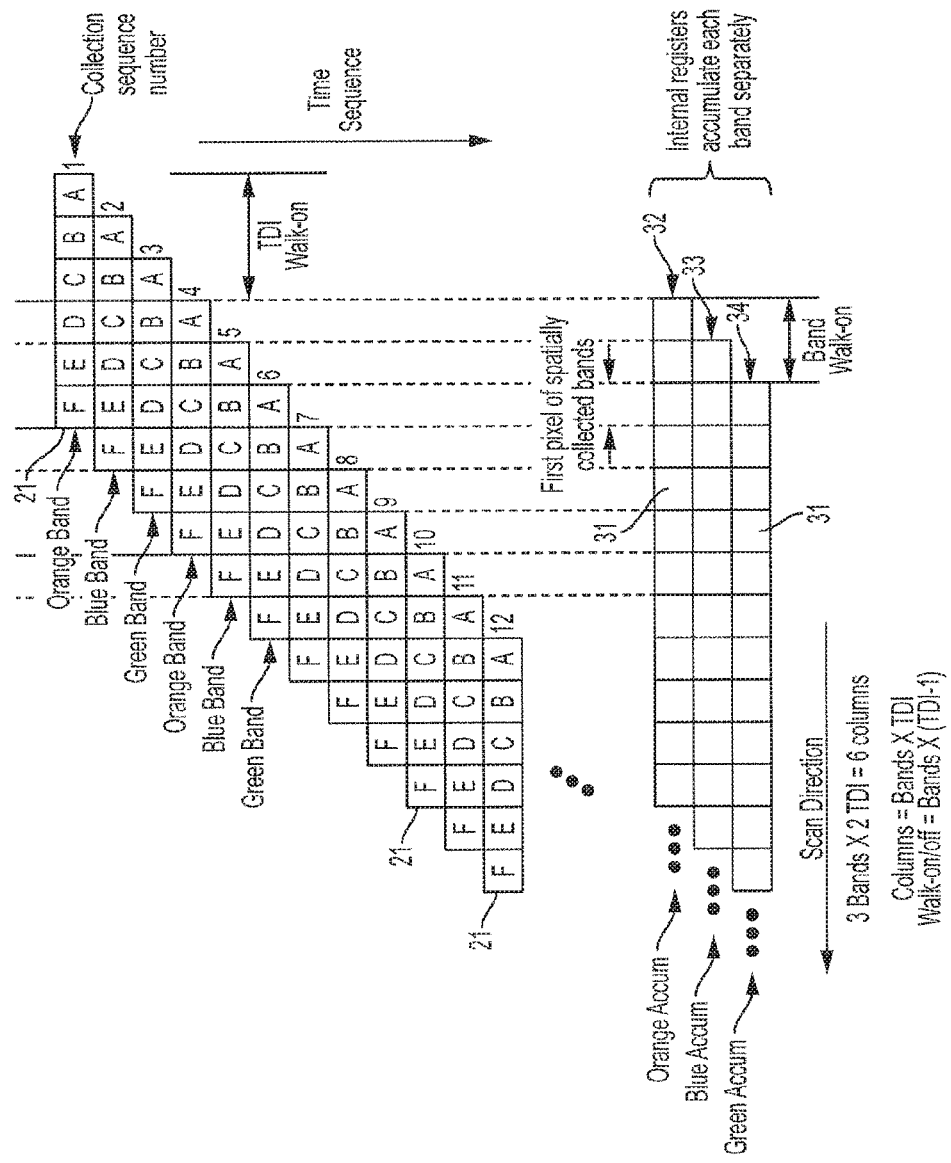
FIG. 3 is an example of an embodiment of the present invention, in which three interlaced image bands capture three color bands, respectively, by using a single array (single row) to image successive frames, or snaps.

Conventional devices do not have the capability to accumulate multiple interlaced images when using a single accumulation ROIC per detector array. By having multiple accumulators attached to a single photo detector array, consecutive reads of a detector array (for example, a single row) is read into independent accumulation register banks. FIG. 3 illustrates an example of a concept of switching the source image, or image band color on a single array and collecting independent frames. Assuming a three color filter wheel (not shown) rotating at high speed in front of an image array, with each image array lasting so long as a given color of the wheel is in view, three independent images may be captured. If the frames are collected as the array is scanned in phase with the target, the image moves phase synchronously with the array.

Figure 1:
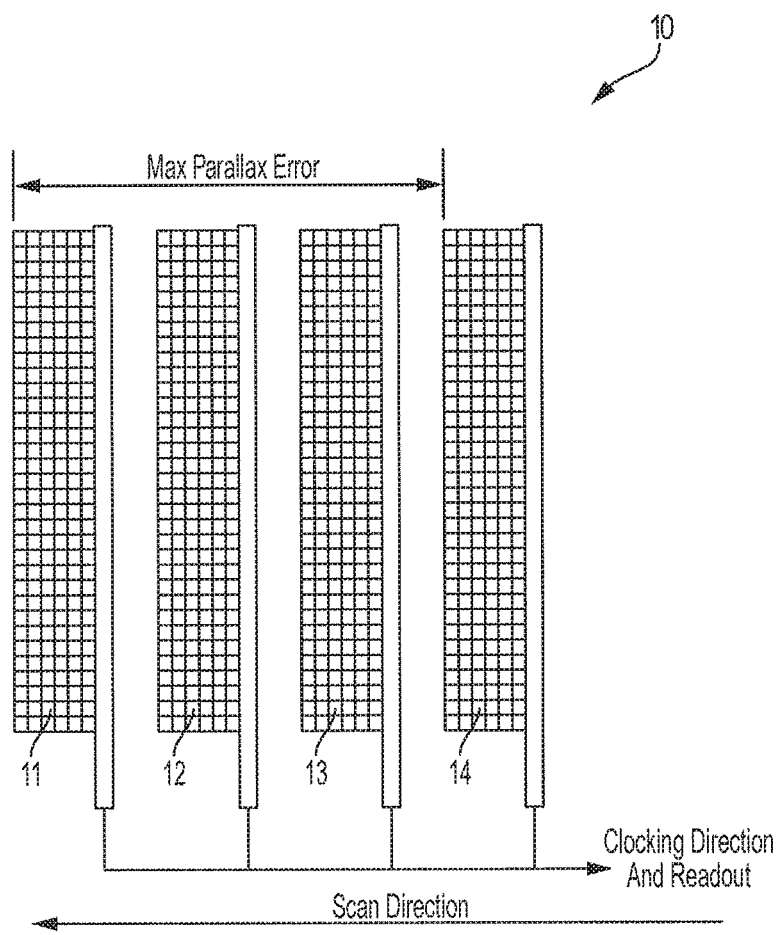
FIG. 1 is a four color spectral filter array with independent time delay integration (TDI), in which the arrays are covered by four discrete filters each providing a separate color.
Figure 2:
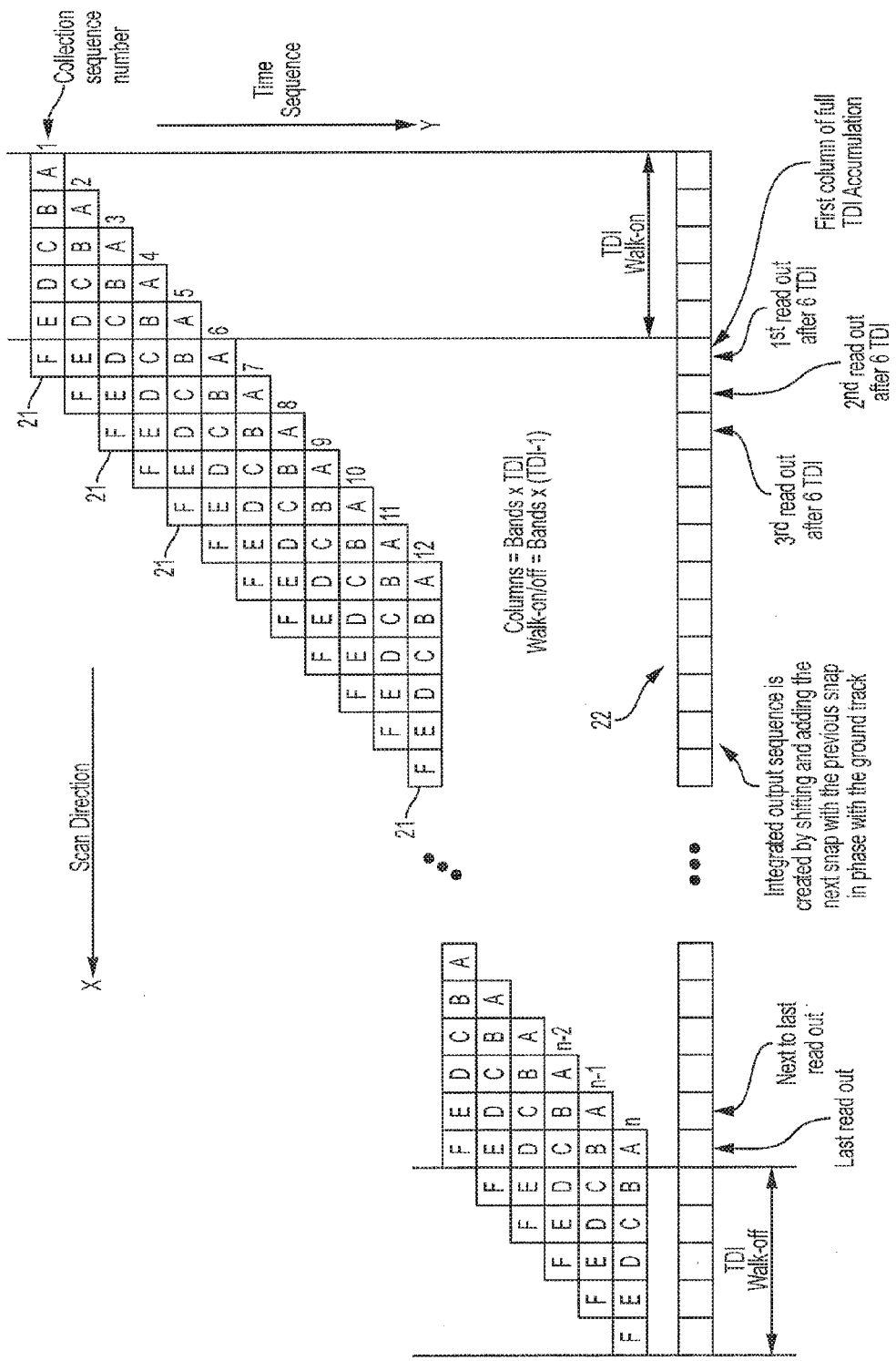
FIG. 2 is an example of a digital TDI time sequence showing accumulation for a single band. After a TDI walk-on of 5, the example provides a TDI of 6 using 6 frames or snaps.

As shown, FIG. 3 depicts collection sequence numbers (or frame numbers) 1-12, which are similar to the collection sequence numbers 1-12 of FIG. 2. In both figures the imager array includes one row of six pixels (A-F) and each frame 21 consists of the same six pixels. A difference between both figures is that the imager in FIG. 2 only has one color band, whereas the imager in FIG. 3 includes a three color bands. The three color bands are produced by a three color wheel (orange, blue, green) or other means of electronically switching the three color bands. The wheel is rotated at a high speed, so that each image lasts only as long as a given color of the wheel is in view (as within interval 81 shown, for example, in FIG. 8). Thus, frame 1 views the scene while the orange color (or filter) is in front of the single array imager. Similarly, frame 2 views the scene while the blue color (or filter) is in front of the imager. Lastly, frame 3 views the scene while the orange color (or filter) is in front of the imager. The color wheel continues to rotate, so that frame 4 has an orange filter, frame 5 has a blue filter, frame 6 has a green filter, and so on. It will be appreciated that the color filter must be changed between the time one image array is integrated and read out and the next color integration time begins (as within interval 82 shown, for example, in FIG. 8).

It will be understood that the aforementioned physical rotation of a three color wheel may be replaced with a digital three color filter, in which each color filter is electronically changed between the time one image capture is integrated and read out and the next integration time begins. Of course, more than three color bands may be sequentially switched in front of the single array imager.

In the example of FIG. 3, the three color bands have a parallax alignment error equivalent to the offset of only three pixels. In this case, the imager has 2 TDI, when pixel A of frame 4 is aligned with pixel D of frame 1, pixel B is aligned with pixel E, and pixel C is aligned with pixel F to create the image. One set of color alignment is shown in which Orange A is spatially aligned with Green B and Blue C.

In a system where the filtered image projected on the array can be changed between image captures, the parallax offset is as follows:

Parallax offset=number of filters×pixel pitch

The three filter bands shown in FIG. 3, assuming a 25 um pixel pitch, would produce a parallax offset between bands of only 75 um at the focal plane.

With only one array, each time the image filter on the array changes, the readout points to a different accumulator in the digital domain. The next time that a particular image filter is again on the array, the readout is shifted and added to the previous image of the same filtered array. It will be appreciated that a system with N filter bands requires N accumulators, where the shift, or offset between accumulations is equal to the number of bands in the array. For the three bands example of FIG. 3, the shift, or offset is three pixels.

The three filter bands in FIG. 3 require 3 accumulators, shown as an orange accumulator 32, a blue accumulator 33 and a green accumulator 34. Each accumulator includes its own internal registers 31, which accumulate each band separately. The orange accumulator 32 adds the spatially aligned orange pixel A (in frame 4) with orange pixel D (in frame 1); the spatially aligned orange pixel B (in frame 4) with orange pixel E (in frame 1); and the spatially aligned orange pixel C (in frame 4) with orange pixel F (in frame 1).

Similarly, the blue accumulator 33 adds the spatially aligned blue pixel A (in frame 5) with blue pixel D (in frame 2); the spatially aligned blue pixel B (in frame 5) with blue pixel E (in frame 2); and the spatially aligned blue pixel C (in frame 5) with blue pixel F (in frame 2).

Similarly, the green accumulator 34 adds the spatially aligned green pixel A (in frame 6) with green pixel D (in frame 3); the spatially aligned green pixel B (in frame 6) with green pixel E (in frame 3); and the spatially aligned green pixel C (in frame 6) with green pixel F (in frame 3).

As described previously, TDI is 2 for the example of 3 color bands shown in FIG. 3, when the number of columns is 6.

Figure 4:
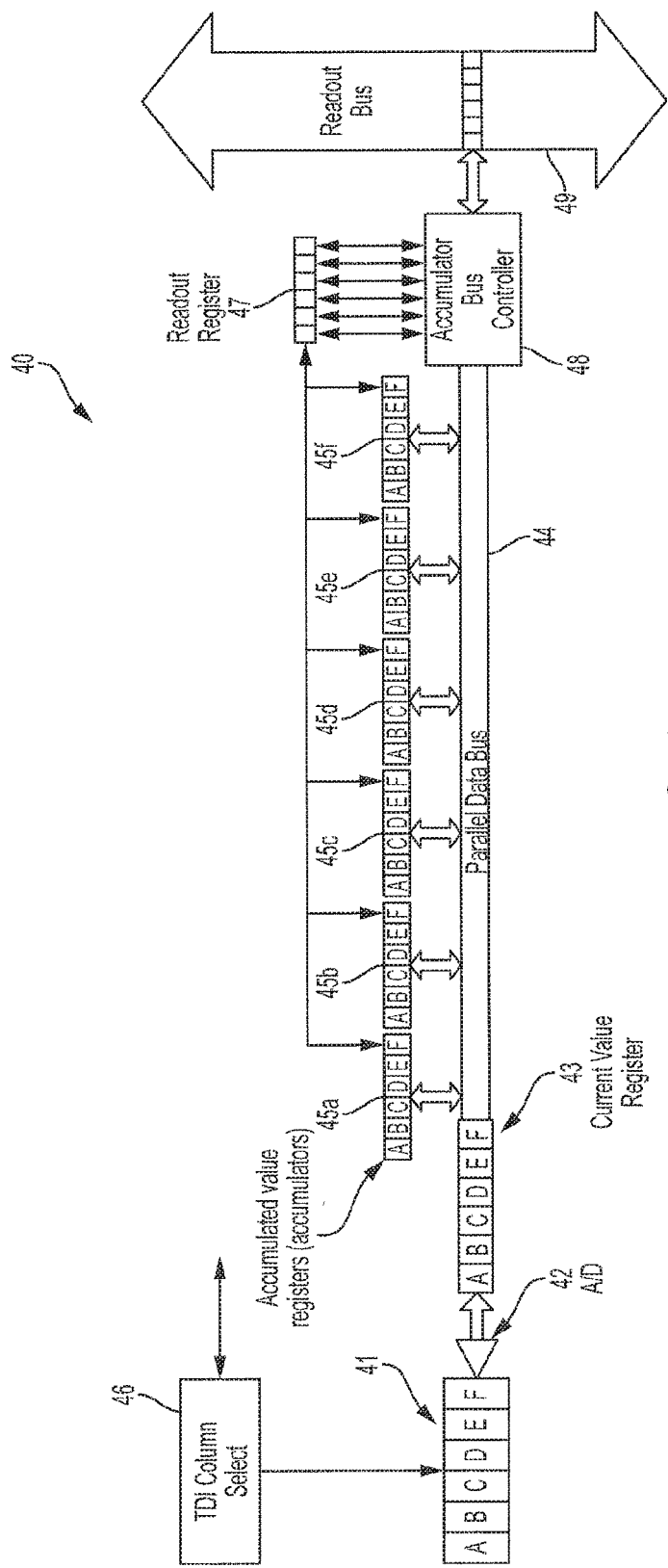
FIG. 4 is an example of a digital ROIC readout with a six band accumulator (six accumulated value registers) each having a shift/sum function. This example may provide read outs of 3-bands by 2-TDI; 2 bands by 3-TDI; or 1 band by 6 TDI, in accordance with an embodiment of the present invention.

Referring next to FIG. 4, there is shown a multi-register bank enhanced read out system, designated as 40. The read out system 40 includes a focal plane array (FPA) 41, analog-to-digital (A/D) converter 42, one current value register 43, six accumulators 45a through 45f, readout register 47, and accumulator & bus controller (simply referred to as controller) 48. The FPA 41, in the example, is a one row and six column array of photo detectors (also referred to as pixels once a digital value has been assigned by the A/D converter) mounted on a ROIC. The FPA 41 is shown connected to A/D converter 42 and current value register 43. The current value register 43 communicates with the six accumulators by way of a parallel data bus 44. The readout register 47 is configured to receive the value of pixel F from each of the six accumulators 45a-45f. The accumulated outputs from the readout register may be communicated off-chip by way of a readout data bus 49. The controller 48 is configured to control system 40 by performing the following steps, or functions:

(a) selecting the appropriate pixel column of FPA 41 via TDI column selector 46 and outputting each pixel value to A/D converter 42, the latter providing digital conversion (value assignment) of each pixel value;

(b) storing the current digital value of each pixel in the current value register 43, the latter providing six separate registers (as an example) for storage of the six pixel values;

(c) for each read cycle of FPA 41, summing the current value stored in current value register 43 with the value stored in an accumulator at position N (any one accumulator from six accumulators 45a-45f);

(d) shifting out all (F) pixel values for each accumulator 45a-45f to the readout register 47;

(e) for the next reading cycle of FPA 41, repeating steps (a) through (d) with the next positioned accumulator N+1; and (f) using controller 48, aggregate the F pixels shifted into the readout register 47 N times to provide an N times larger integrated value in conjunction with an N times larger footprint. A lower resolution footprint is directly traded for a larger signal-to-noise ratio (SNR) of the captured scene per image band with the aggregation.

Figure 8:
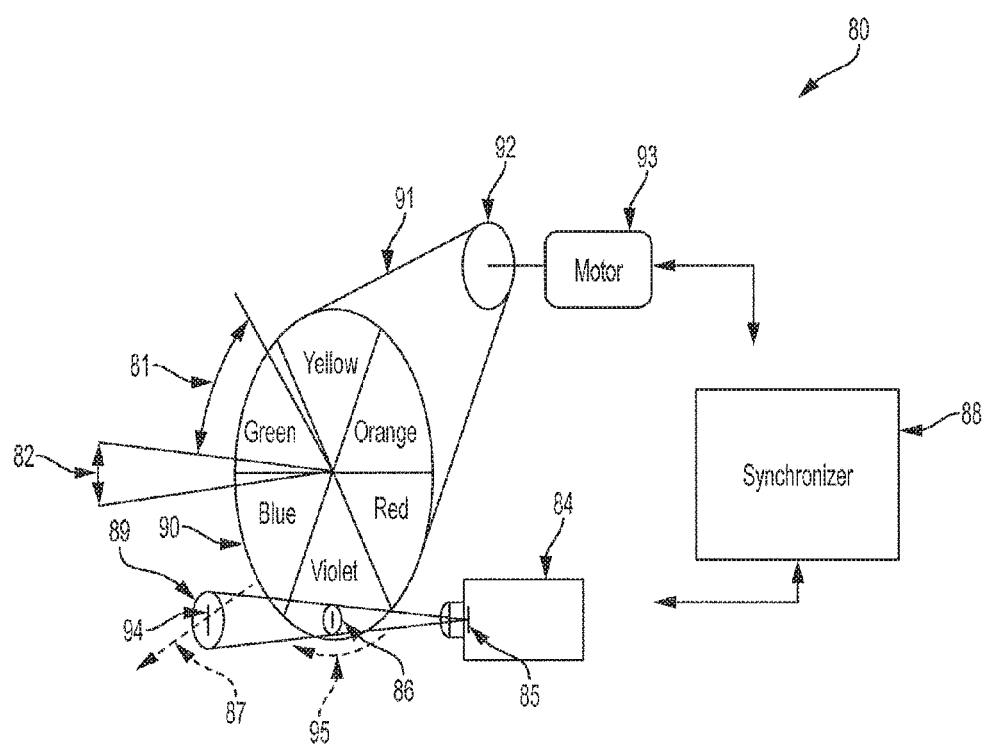
FIG. 8 is an example of a six band digital TDI imaging system with a six band filter wheel rotating synchronously with the detector frame capture sequence, in which the filter wheel, frame capture, and target image motion operate in synchronism. This example may provide read-outs of 6 bands by 1-TDI, in accordance with an embodiment of the present invention.

Assuming that the image is translated across the scene at a rate equal to the motion of the FPA, the column selector 46 is clocked by controller 48 such that the charge packets of the array move across the sensor synchronously with the image. After digitization, the data from pixels A-F is serially shifted into current value register 43. The data comprising pixels A-F is now digitized and stored in current value register 43. The data values of pixels A-F may be transferred to any one of accumulators 45a through 45f, depending on the filter band associated with each reading cycle of FPA 41. Thus, if six different bands are desired, each accumulator 45a-45f receives data from the current value register at a correspondingly different reading cycle of FPA 41, as a six color wheel rotates in front of FPA 41. (As an example, FIG. 8 shows a six color wheel 90 rotating in direction 95 in front of FPA 85.)

The first accumulator 45a may be for integrating pixels viewed with a red filter, the second accumulator 45b may be for integrating pixels viewed with an orange filter, the third accumulator 45c may be for integrating pixels viewed with a yellow filter, and so on.

One possible mode of operation for system 40, shown as an example in FIG. 4, may be as follows:

(a) integrate values in the active area of FPA 41;

(b) convert to 16 bit words by A/D converter 42;

(c) store the 16 bit words from A/D converter 42 in current value register 43;

(d) sum current value in register 43 (no shift or sum if all 6 bands are used with all 6 columns, all 6 pixels will be readout before the next current value of the same color band is placed in the accumulator) with value stored in the accumulator at position N (one of accumulators 45a-45f);

(e) shift out all F pixel values for each of the six accumulators to readout register 47;

(f) for the next integrated value, repeat the above steps with accumulator at position N+1 (next accumulator in the sequence);

(g) for each read cycle of the FPA, all accumulators (six in this example) are shifted out; and (h) when using only three bands (as shown in FIG. 3), only accumulators 45a through 45c are shifted by 3 and summed with the current values in the current value register in sequence (1, 2, 3, 1, 2, 3, 1, 2, 3); accumulators 45d, 45e and 45f are not accumulated, but are shifted out.

Although all the accumulators may be used, nevertheless, since only three bands are used in the example of FIG. 3, only accumulators 45a through 45c contain image data. Of course any three of the six accumulators may be used, or more than one accumulator may be used for a single band. If only three bands are desired, all six accumulators may be shifted out to readout register 47 at the end of each cycle. In order to have spatially overlapping bands with TDI capability, if the system has six accumulators then an even multiple of pixel columns must be used. For example, for one TDI, all six bands may be used; for 2 TDI, three bands may be used; and for three TDI, only two bands may be used. For TDI greater than one, the number of detector columns must be a factor of 2, and (TDI× Bands) must be equal to the number of pixels in the detector column. With the six accumulators shown in FIG. 4, from one to six independent images may be constructed.

The present invention utilizes enhanced features of shift, accumulate and aggregate functions built into the on-chip CMOS architecture, as shown for example in FIG. 4. These enhanced features allow the digital TDI accumulation function to provide TDI accumulation for multiple spectral bands (six bands are shown in FIG. 4), and for image sources that can be switched into and out of the field-of-view (FOV) in a few microseconds. Multiple images stored in memory can be accumulated and aggregated independently, as shown by system 40. As the phase of the imager is shifted by a single pixel on the target, the digital pixel values are also shifted in memory, in sequence, to match image phasing as the scene is moving.

For a single band, the present invention only requires use of a single accumulation register for integration and shifting of the signal. For multiple bands, the ROIC may be a conventional row/column select CMOS ROIC with additional capability to digitize and selectively process multiple images within a single monolithic device; however, multiple images require corresponding multiple accumulators for multiple integration and shifting; the number of shifts is equal to the number of bands being utilized. System 40, for example, when incorporated into configuration 80 as array 85, includes a capability of processing up to six independent bands associated with the six independent filters configured on filter wheel 90.

Returning now to FIG. 3, it may be appreciated how multiple accumulation registers for each pixel row can be used to time-delay and integrate more than one band of interest. Once the 'TDI walk-on' and 'band walk-on' have been satisfied, each following pixel read from the accumulation registers contains a complete integrated pixel value. If two bands are being integrated (3 TDI), the shift per band is two pixels before the accumulation takes place; for three bands (2 TDI), the shift per band is three pixels; and so on. In order to have multiples of TDI per band, the number of registers must be equal to the number of bands multiplied by the number of desired TDI stages. For the embodiment shown in FIG. 3, the number of bands is 3 and the number of TDI is 2; thus, the system needs to have a minimum of 6 columns, namely, columns A-F. For the given number of bands, the colocation parallax between pixels is offset by the number of bands; for three bands, the spatial offset is three pixels on the target. The three pixel offset may be seen in FIG. 3, as the orange band's column A aligns with the orange band's column D.

Figure 5:
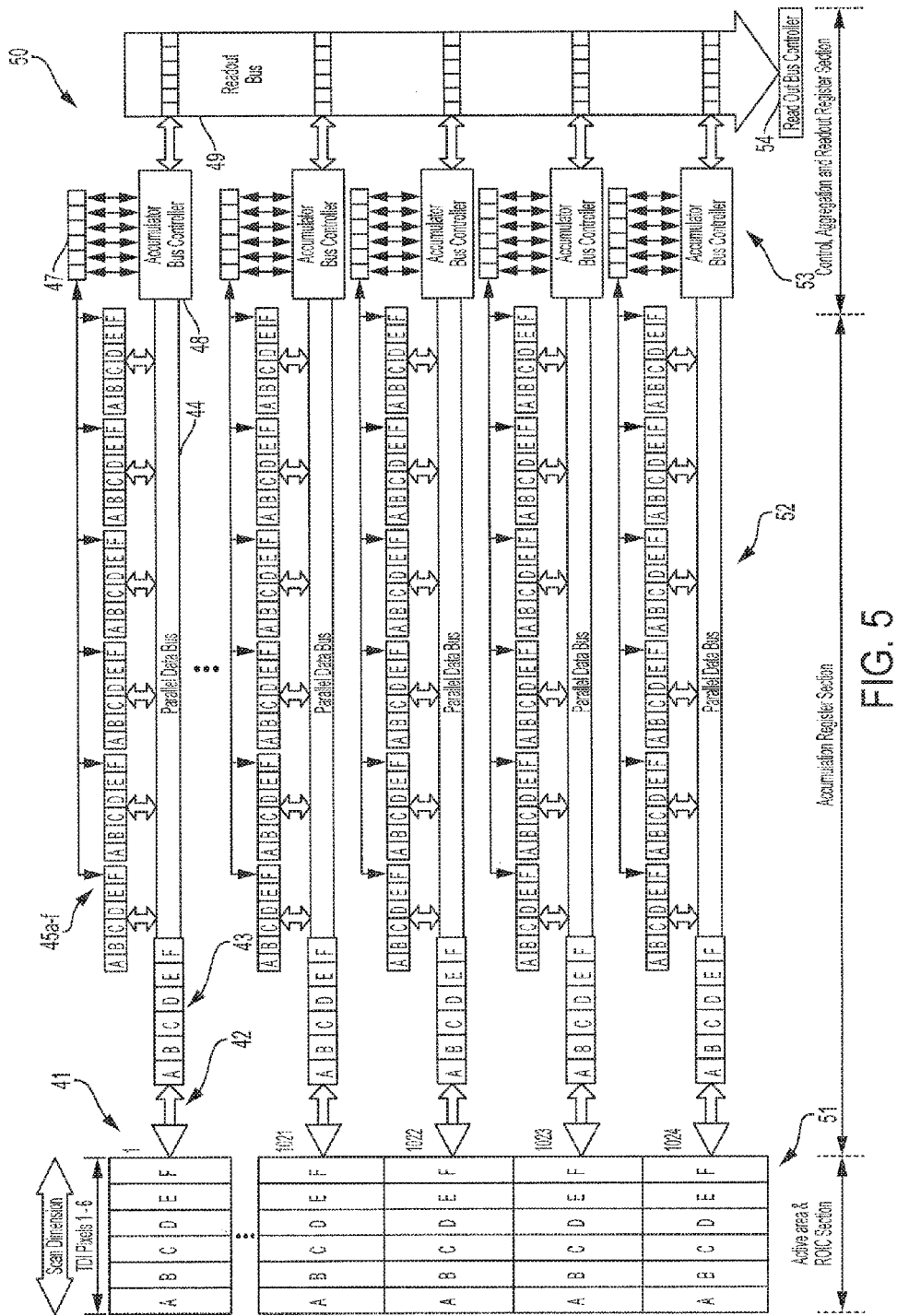
FIG. 5 is an example of an FPA having N rows (1024 rows) by M columns (6 columns) feeding a digital accumulation section and an aggregation & readout section, in accordance with an embodiment of the present invention.

Turning next to FIG. 5, another embodiment is shown designated as system 50. The system 50 has a capability to integrate each pixel row in either direction (left or right of page); this may be accomplished by changing the shift direction. In addition, system 50 may accumulate more than one image, or spectral band at one time. The architecture of system 50 also allows the array to accumulate data in a staring mode, as well as a step-stare mode. High transfer rates in system 50 allow the imager to track target motion by capturing a burst sequence. In the example of FIG. 5, six consecutive frames can be captured and stored.

More specifically, system 50 includes an FPA 51, which is in the active area and ROIC section; multiple banks of accumulators 52, which are in the accumulation register section; and multiple controllers with a readout bus 53, which are in the control, aggregation and readout register section. As shown, FPA 51 includes 1024 rows (as an example), with each row designated as 41, and 6 columns (for example) of pixels, designated as pixels A through F. Each array, or row 41 is connected to a set of features, namely, an A/D converter 42, one current value register 43, six accumulators 45a through 45f, readout register 47, and accumulator & bus controller (simply referred to as controller) 48. The set of elements connected to each array 41 in FIG. 5 include the same elements connected to the single array 41 depicted in FIG. 4. The set of elements operate on each array 41 of FPA 51 independently of each other, and in a manner that is similar to that described with respect to system 40 in FIG. 4. It can be appreciated that unused or additional accumulation registers may be incorporated (more than six in this embodiment) for various pixel-by-pixel signal processing functions such as band additions and/or subtractions to name a few of the rudimentary possible uses for additional accumulation registers.

In addition to the multiple accumulator bus controllers 48, system 50 includes a readout bus controller 54 for controlling the transfer of the output data from each of the multiple readout registers 47.

Another embodiment of FPA 51 in system 50 may include 96 TDI columns and 1024 rows. In addition, system 50 may include 48 accumulation value registers, so that 48 consecutive frames can be collected at the transfer rate of 4,800 frames per second (fps). Accordingly, the 1024×96 array is effective in providing up to 48 independent bands (register banks) and 12 different TDI configurations, between 1 TDI and 96 TDI. Each row 41 of the 1024×96 array feeds a 14 bit A/D converter 42, producing one word of data for each of the 96 pixels in the row, as each pixel is read out.

The A/D converter 42 feeds into the aforementioned features of system 50 that may also be referred to as a 'summing engine'. The summing engine reads the existing value from an accumulated value register 45 ($N^{th}$ accumulator), and shifts the existing value in the accumulated value register 45 ($N^{th}$ accumulator) in the direction of shift depending on the array scan direction (left or right). Next, the summing engine sums that shifted value with the current value stored in the current value register 43 and places the result back in the same accumulated value register 45 ($N^{th}$ accumulator). The summing engine then repeats these steps for the next accumulated value register 45 ($N^{th}$+1 accumulator). All the F pixels are read simultaneously by the readout register 47 and each of the F pixels from each accumulated value register 45 is aggregated with a previous F pixel read from the respective accumulated value register 45. The aggregation provides increased target sample area of the image as the scene is moving, because each of two successive F pixels are now included in the aggregated sum, for a higher signal to noise ratio (S/N) due to the integration of pixels in the scan direction.

For standard digital TDI operation, the values in the accumulated value register may be shifted left or right, by one or more pixel, depending on the scan direction prior to the summation. Under these circumstances, the value may be shifted by an amount equivalent to the desired number of accumulated value registers 45 in use.

With a 4,608 word wide register array, 48 linear accumulation registers of 96 digital words may be accommodated (with all 48 registers in use, the shift would be 48 pixels and the TDI would be 2). In the example of FIG. 5, each of the six accumulator banks (or accumulated value registers 45) can process a different color, or a differently filtered image.

A variety of tessellations are possible as illustrated in FIGS. 6A and 6B to create long linear arrays of two or more. As shown, the active detector is bump-bonded onto the edge of the ROIC, with the ROICs arranged to produce a single long linear imaging array. The detector spacing or pixel pitch in the cross-scan direction is maintained in order to provide a contiguous image. With this method arbitrarily long imaging arrays can be constructed. The tessellation schemes of FIGS. 6A and 6B provide different amounts of offset and overlap.

Figure 7:
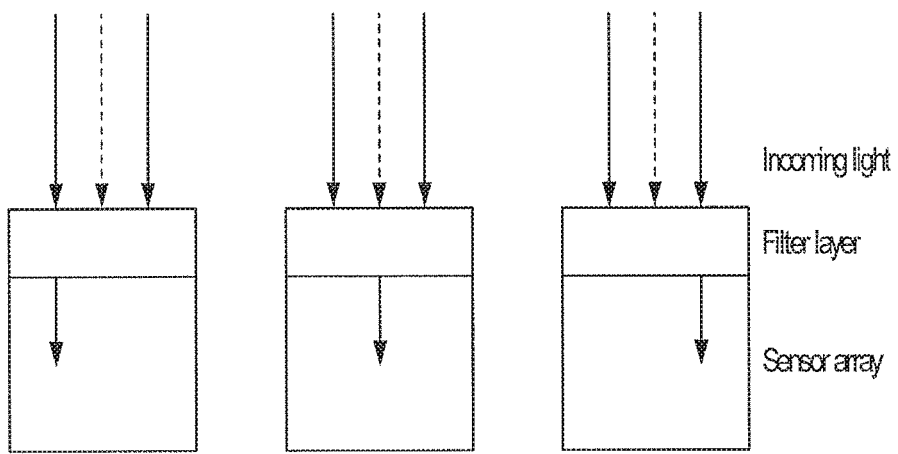
FIG. 7 is an example of three color filter bands mounted on three sensor arrays to provide filtered images captured by an FPA.

FIG. 7 is an example of a color filter array (CFA) for arranging RGB color filters on a grid of photo sensors. As shown, the incoming light passes through an RGB filter band prior to impinging on the sensor array. In another example shown in FIG. 8, the filters include a color wheel 90 that rotates as the image of a scene is captured.

As shown, filter wheel 90 is attached to motor 98 and pulley system 91, 92 and controlled by synchronizer 88. The filter wheel rotates in synchronism with image frame 94, which is projected on the target 89 by the sensor array 85. The sensor array 85 is disposed in optical system 84 as it moves in phase with the target motion 87. The target 89 is viewed through filter wheel 90 at location 86 during the frame integration interval 81, as shown for the violet section of the filter wheel.

One possible mode of operation for system 80 when using FPA 41 (or FPA 85 in FIG. 8) coupled to the various registers and accumulators of system 40 in FIG. 4, may be as follows:

(i) integrate values in the active area of FPA 41 during interval 81;

(j) convert to 16 bit words by A/D converter 42 during interval 82;

(k) store the 16 bit words from A/D converter 42 in current value register 43 during interval 82;

(l) sum current value in register 43 with value stored in the accumulator at position N (one of the accumulators 45a-45f) during interval 82;

(m) shift out all F pixels values for each of the six accumulators to readout register 47;

(n) for the next integrated value, repeat the above steps with accumulator at position N+1 (next accumulator in the sequence) and the filter wheel 90 (next filter color in the rotation sequence) in the next color interval 81;

(o) for each read cycle of the FPA, all accumulators (six in this example) shift out during interval 81, while the next frame is integrating in the photo active area of FPA 41; and (p) when using all six bands (as shown in FIG. 4) then system 80 utilizes all six accumulators 45a through 45f. Each accumulator includes only one value from the current value register following in sequence (1, 2, 3, 4, 5, 6, 1, 2, 3, 4, 5, 6) and shifted out in synchronism with rotation 95 of filter wheel 90. For this six band case of FPA 41, only 1 TDI is possible as a result, no summations occur. (the last pixel value from the previous register load is shifted out before the next current value register contents are placed in the accumulator)

The present invention may be utilized in many different functions. Examples of such functions include:

Multiple filter band switching;

Multiple source temporal isolation (spinning mirror applications);

On chip image stacking for higher SNR, as well as sub pixel resolution;

Windowed video tracking (readout rate limited);

High speed burst capture of multiple frames (limited by the number of accumulators and maximum transfer rate);

Multiple spectral band colocation with minimal parallax distortion; and

Bump bonded image sensors from THz to X-ray wavelengths.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An integrated circuit for generating data of an image comprising:
a focal plane array (FPA) of sensing elements for capturing an image of a scene in motion relative to the FPA,
a current value register for storing pixel values captured by the sensing elements,
a plurality of accumulated value registers for selectively summing the pixel values from the current value register with pixel values previously stored in one of the accumulated value registers, and
a readout register for selectively receiving a sub-set of the summed pixel values from the one accumulated value register,
wherein the sub-set of the summed pixel values corresponds to a time delayed integration (TDI) value of at least one column of multiple frames taken of the scene in motion.

2. The integrated circuit of claim 1 further comprising:
an analog/digital (A/D) converter serially coupled to the FPA for digitizing the captured image and transferring the captured image to the current value register.

3. The integrated circuit of claim 1 wherein
the FPA includes at least one row and N columns of sensing elements, in which the value of N is an integer greater than 1, and
the current value register is configured to store N pixel values captured by the one row of sensing elements, in which the N pixel values are stored in N registers.

4. The integrated circuit of claim 3 wherein
the accumulated value registers each includes N accumulated values, in which M accumulated value registers are included with integer multiples of N pixel values, and
each accumulated value register includes N registers for receiving the N pixel values stored in corresponding N registers of the current value register.

5. The integrated circuit of claim 4 wherein
the one accumulated value register is configured to shift the N pixel values by one register position.

6. The integrated circuit of claim 5 wherein
the readout register is configured to receive the sub-set of the summed pixel values, in which the sub-set is defined as a pixel value stored in an $N^{th}$ register of the one accumulated value register, and
the $N^{th}$ register is a register positioned last in a shift sequence of N registers.

7. The integrated circuit of claim 6 further comprising:
an accumulator in communication with the readout register for aggregating a sequence of the received sub-set of the summed pixel values,
wherein the sequence represents an integrated output of pixels in phase with the scene in motion.

8. The integrated circuit of claim 1 further comprising:
a parallel data bus coupled between the current value register and each of the accumulated value registers, and
a controller for selectively outputting a first set of pixel values from the current value register to one of the accumulated value registers, and next outputting a second set of pixel values from the current value register to another one of the accumulated value registers.

9. The integrated circuit of claim 8 wherein
the first set of pixel values read into the current value register during a first frame obtained by the sensing elements is subsequently stored in a first accumulation register, and
the second set of pixel values read into the current value register during a second frame obtained by the sensing elements is subsequently stored in a second accumulation register.

10. The integrated circuit of claim 9 further comprising:
multiple filter bands for filtering the first frame with a first color filter and the second frame with a second color filter,
wherein the first set of pixel values is filtered by the first color and the second set of pixels is filtered by the second color, and
the one of the accumulated value registers is configured to receive a first color filtered set of pixel values, and the other one of the accumulated value registers is configured to receive a second color filtered set of pixel values.

11. An integrated circuit for generating data of an image comprising:
- a focal plane array (FPA) of M rows and N columns of pixels for capturing successive frames of an image of a moving scene, in which each frame includes a succession of sets of rows of pixels, in which each set includes at least one row of pixels,
- multiple current value registers, in which each current value register is configured to store current pixel values captured from a respective row of pixels,
- a plurality of sets of accumulated value registers, in which each set of accumulated value registers is configured to communicate with a respective current value register,
- a plurality of readout registers, in which each readout register is configured to communicate with a respective set of accumulated value registers, and
- a controller for providing, in succession, rows of pixel values into at least one set of accumulated value registers, shifting and summing the rows of pixels and outputting a summed column as a time delayed integrated (TDI) signal.

12. The integrated circuit of claim 11 wherein execution by the controller includes the following steps:
- pixel values from a first row of pixels are propagated to a first accumulated value register in a first set of accumulated value registers;
- the first row of pixels in the first accumulated value register is shifted by at least one column;
- a second row of pixels are provided to the first accumulated value register and summed with the first shifted row of pixels; and
- a column of the summed first and second row of pixels stored in a first accumulation register is read out to a first readout register.

13. The integrated circuit of claim 11 further comprising:
- an analog/digital (A/D) converter coupled between each row of pixels and each current value register,
- wherein each A/D converter is configured to digitize pixel values of a respective row of pixels.

14. The integrated circuit of claim 11 further comprising:
- multiple filter bands for filtering at least a first row of pixels with a first color filter and a second row of pixels with a second color filter,
- wherein pixel values from the first and second color filters are propagated to first and second accumulated value registers, respectively, in the one set of accumulated value registers.

15. The integrated circuit of claim 14 wherein
the controller is configured to provide, in succession, rows of pixel values into the sets of accumulated value registers, respectively, in which each set receives pixel values from the multiple filter bands for each row of pixels.

16. The integrated circuit of claim 14 wherein
the multiple filter bands include up to 48 independent color bands, in which each color band is accommodated by up to 48 accumulated value registers in each set of accumulated value registers, and
the controller is configured to provide multiple TDI configurations, in which each TDI varies between 1 and 96.

17. The integrated circuit of claim 14 wherein
the multiple filter bands are provided by a color wheel rotating in front of the FPA at a rate dependent on the motion of the FPA relative to the scene.

18. The integrated circuit of claim 11 wherein
the controller is configured to shift, in succession, the rows of pixel values in a direction dependent on the motion of the FPA relative to the scene.

19. A method for reading out image data from a moving platform comprising the steps of:
- capturing successive image frames of a moving scene using a focal plane array (FPA) of N columns and at least one row of pixels;
- filtering the successive image frames using multiple color bands;
- storing, in succession, current first and second colored image frames from the at least one row of N pixels in a current value register;
- moving, in succession, the current first and second colored image frames into first and second accumulated value registers;
- shifting the first colored image frame in the first accumulated value register, and shifting the second colored image frame in the second accumulated value register;
- storing, in succession, another current first and second colored image frames into the current value register;
- summing, in succession, the first and second colored image frames in the first and second accumulated value registers, respectively, with the other current first and second colored image frames from the current value register; and
- outputting from a readout register the first summed and second summed colored image frames as time delayed integrations (TDIs), respectively.

20. The method of claim 19 wherein
the steps of shifting and summing are provided by separate accumulated value registers, in which each accumulated value register is associated with a particular color band.

* * * * *